United States Patent
Somayaji (10) Patent No.: US 12,452,213 B2
(45) Date of Patent: Oct. 21, 2025

(54) UPDATE OF FIREWALL TABLES USING ETHERNET VIRTUAL PRIVATE NETWORK (EVPN) ROUTE TYPE

(71) Applicant: Hewlett Packard Enterprise Development LP, Spring, TX (US)

(72) Inventor: Nitya Prabha Somayaji, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 191 days.

(21) Appl. No.: 18/065,852

(22) Filed: Dec. 14, 2022

(65) Prior Publication Data

US 2024/0205190 A1   Jun. 20, 2024

(51) Int. Cl.
*H04L 29/06* (2006.01)
*H04L 9/40* (2022.01)

(52) U.S. Cl.
CPC ...... *H04L 63/0263* (2013.01); *H04L 63/0272* (2013.01); *H04L 63/029* (2013.01)

(58) Field of Classification Search
CPC . H04L 63/02; H04L 63/0263; H04L 63/0272; H04L 63/029
USPC .................................................. 726/1, 11, 15
See application file for complete search history.

(56) References Cited

U.S. PATENT DOCUMENTS

| | | | |
|---|---|---|---|
| 10,243,916 B2 | 3/2019 | Mahajan et al. | |
| 10,454,877 B2 | 10/2019 | Fernando et al. | |
| 10,931,523 B2 * | 2/2021 | Shu | H04L 41/0895 |
| 11,341,195 B2 * | 5/2022 | Agarwal | G06F 16/951 |
| 11,588,724 B2 * | 2/2023 | Hofer | H04L 63/0263 |
| 11,748,148 B2 * | 9/2023 | Behera | H04L 41/0806 709/220 |
| 11,824,897 B2 * | 11/2023 | Kwan | H04L 63/20 |
| 12,010,011 B2 * | 6/2024 | Lin | H04L 41/0668 |
| 2003/0120816 A1 * | 6/2003 | Berthaud | H04L 63/0218 709/248 |
| 2014/0123215 A1 * | 5/2014 | Nakae | H04L 63/20 726/1 |
| 2014/0223507 A1 * | 8/2014 | Xu | H04L 63/0272 726/1 |
| 2020/0136863 A1 * | 4/2020 | Huang | H04L 61/2592 |
| 2020/0136955 A1 * | 4/2020 | Chen | H04L 63/029 |
| 2021/0067493 A1 * | 3/2021 | Vixie | H04L 63/0272 |
| 2022/0294728 A1 * | 9/2022 | Liu | H04L 43/12 |

(Continued)

OTHER PUBLICATIONS

Cisco, "VXLAN Network with MP-BBP EVPN Control Plane Design Guide", Jan. 22, 2018, 41 pages.
Juniper, "Junos® OS EVPN User Guide", Mar. 13, 2022, 2271 pages.

*Primary Examiner* — Bharat Barot
(74) *Attorney, Agent, or Firm* — Hewlett Packard Enterprise Patent Department (57) ABSTRACT

Examples described herein relate to synchronization of distributed firewall tables using an EVPN route type. Examples include detecting an update to a firewall table at a network device and generating a control packet indicating that update. The control packet is consistent with an EVPN route type, which is a format to incorporate changes to firewall rules of the firewall table. Examples include advertising the control packet, which specifies the update to neighboring network devices. A neighboring network device may receive the advertised control packet and synchronize a respective firewall table with the update based on a local policy.

20 Claims, 5 Drawing Sheets

(56) References Cited

U.S. PATENT DOCUMENTS

2022/0360561 A1\* 11/2022 Rajput ................ H04L 63/0263
2022/0394603 A1\* 12/2022 Majumdar .......... H04L 12/4633

\* cited by examiner

402 — DETECT AN UPDATE IN A FIREWALL TABLE

404 — GENERATE A CONTROL PACKET BASED ON ETHERNET VIRTUAL PRIVATE NETWORK (EVPN) ROUTE TYPE, WHEREIN THE EVPN ROUTE TYPE IS A FORMAT FOR INCORPORATING THE UPDATE IN THE CONTROL PACKET

406 — ADVERTISE THE CONTROL PACKET TO NEIGHBORING NETWORK DEVICES FOR SYNCHRONIZATION OF THE FIREWALL TABLE

502 — RECEIVE, AT A DESTINATION DEVICE, A CONTROL PACKET INDICATING AN UPDATE TO A FIREWALL TABLE FROM A NEIGHBORING NETWORK DEVICE, WHEREIN THE CONTROL PACKET IS BASED ON AN ETHERNET VIRTUAL PRIVATE NETWORK (EVPN) ROUTE TYPE THAT INCORPORATES THE UPDATE IN THE CONTROL PACKET

504 — SYNCHRONIZE DESTINATION FIREWALL TABLE WITH THE UPDATE

UPDATE OF FIREWALL TABLES USING ETHERNET VIRTUAL PRIVATE NETWORK (EVPN) ROUTE TYPE

BACKGROUND

A datacenter may implement a spine-leaf network topology for connecting network nodes, such as switches and routers, to reduce network latency and hop count. Such a topology includes spine nodes (e.g., spine switches) and leaf nodes (e.g., leaf switches). The spine nodes interconnect the leaf nodes, and the leaf nodes connect various hosts (e.g., servers) and/or sub-networks in the datacenter to form a physical infrastructure (e.g., an underlay network). An overlay based on virtual extensible local area network (VXLAN) may be used to virtualize the physical infrastructure, where the leaf nodes are VXLAN tunnel endpoints (VTEPs), which are responsible for encapsulation and decapsulation of VXLAN packets.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

Often, datacenters utilize centralized services, such as a centralized firewall service, to block or allow traffic entering or exiting the datacenter. The centralized firewall service may be implemented on a firewall device connected to a virtual extensible local area network (VXLAN) Tunnel Endpoint (VTEP) (e.g., a border leaf switch) in the datacenter. In some cases, the centralized firewall service may become a bottleneck because the traffic entering or exiting the datacenter may be routed through the firewall device. This may add to latency as the firewall device becomes an additional hop for routing the traffic.

Some datacenters use distributed services nodes to reduce bottlenecks caused by centralized firewall services. Distributed services nodes are network devices (e.g., switches) capable of hosting services, such as a firewall, in a distributed manner. In such setups, each network device may independently host its own firewall. Typically, distributed services nodes may be implemented as leaf nodes in a datacenter with a spine-leaf network topology, where the leaf nodes may operate as VTEPs connected using ethernet virtual private network (EVPN). By implementing distributed services nodes in the datacenter, each leaf node or VTEP may host a dedicated firewall instead of implementing a single firewall hosted at a centralized node (e.g., a border leaf switch), thereby removing additional hops associated with a centralized firewall.

A distributed services node may also store some data, which may be used by the dedicated service running on that node. For example, each VTEP hosting a dedicated firewall may store a corresponding firewall table specifying firewall rules associated with traffic received or transmitted by hosts (e.g., servers) that are connected to that VTEP. The hosts may execute workloads, such as applications, containers, or virtual machines (VMs), which may communicate with networks external to the datacenter. Each VTEP allows or blocks traffic according to the firewall rules stored at that VTEP. However, the VTEPs may not store the same firewall rules as each VTEP may be connected to different servers or network of servers (e.g., sub-networks in the datacenter). For example, a first VTEP (connected to a first server) may store a different set of firewall rules compared to that of a second VTEP (connected to a second server).

Such a distributed nature of firewall in the VTEPs may impact traffic exchange between servers within the datacenter and devices external to the datacenter. For instance, when a workload (e.g., a VM) is moved from the first server (connected to the first VTEP) to the second server (connected to the second VTEP), the traffic received from or addressed to the workload may get blocked by firewall at the second VTEP because the second VTEP may not store the firewall rules associated with that workload. In another instance, a link between the first VTEP and the first server may be broken or congested. In such cases, the second VTEP may be temporarily used for forwarding traffic addressed to or received from the first server. In such instances, the second VTEP may not have relevant firewall rules associated with some or all the workloads executing on the first server. As a result, the firewall at the second VTEP may block traffic addressed to or received from the first server.

To address these issues, examples described herein synchronize firewall tables distributed between VTEPs using an EVPN route type that allows exchange of firewall rules in an EVPN. In some examples, a VTEP may detect an update to its firewall table and generate a control packet indicating that update. The control packet is consistent with an EVPN route type, which is a format to incorporate modification to firewall rules specified in the firewall table. The VTEP may advertise the control packet specifying the update to neighboring VTEPs. A neighboring VTEP may receive the advertised control packet and synchronize its firewall table according to the update based on a local policy.

In some examples, the format of the EVPN route type may specify list of updated firewall rules and one or more of a route distinguisher, an ethernet segment identifier, an ethernet tag identifier, a number of updated firewall rules, or the like. By generating control packets based on the format of the EVPN route type, VTEPs operating on different operating systems can exchange firewall table updates with each other. This may allow VTEPs of different vendors to synchronize their firewall tables and avoid unexpected interruptions to traffic.

In some examples, the VTEP may generate a control packet when firewall rule(s) are modified at that VTEP. The firewall rules modifications may include addition, deletion, or editing of firewall rules initiated by an administrator or using an automated process, for example. The VTEP may advertise the control packet specifying the modified firewall rules to neighboring VTEP(s) for synchronization. By synchronizing a firewall table with the modified firewall rules in this manner, examples described herein reduce or remove manual synchronization (e.g., by the administrator) of firewall rules distributed between VTEPs.

In some examples, the VTEP may generate a control packet at regular time intervals (e.g., in response to an expiry of a predetermined period). The VTEP may advertise such a control packet specifying all the firewall rules of the firewall table to neighboring VTEP(s) for synchronization. By synchronizing firewall tables in a periodic manner, examples described herein ensure that the firewall rules across all the VTEPs are consistent.

In some examples, the VTEP may generate a new control packet in response to movement of a workload from a given VTEP to neighboring VTEP(s). The VTEP may identify firewall rule(s) associated with the workload and advertise a control packet specifying those firewall rule(s) to the neighboring VTEP(s) for synchronization. By synchronizing a firewall table with the firewall rules associated with the moved workload in this manner, examples described herein prevent unnecessary traffic blocking at the neighboring VTEP(s).

In some examples, the VTEP may generate control packets in response to a link failure between a given VTEP and a host connected to that VTEP. The VTEP may advertise a control packet specifying firewall rules at the given VTEP to the neighboring VTEP(s). By synchronizing the firewall rules in this manner, examples described herein prevent traffic blocking at the neighboring VTEP(s).

In some examples, local policies may be used for ensuring that the synchronization of firewall tables occurs without compromising security. For example, a local policy may include certain rules for checking whether the VTEP advertising the control packet is a trusted VTEP before the synchronization. By implementing such policies locally, examples described herein allow secure synchronization of firewall tables between VTEPs.

Examples of this disclosure provide improvements by ensuring continuity in traffic forwarding in enterprise networks including core sites (e.g., datacenters) as well as branch sites (e.g., regional offices) regardless of updates to firewall tables distributed between network devices of such sites. The disclosed examples allow modifications to firewall rules (manually by administrators or automatically) at one network device without having to worry about updating the same firewall rules in other network devices. Examples also ensure that movement of workloads between servers of a datacenter do not require manual synchronization of firewall rules at network devices. Examples also ensure that link failures in a datacenter do not cause blocking of traffic. Therefore, examples described herein allow servers to seamlessly communicate with devices external to the datacenter without latency or data loss.

Figure 1:
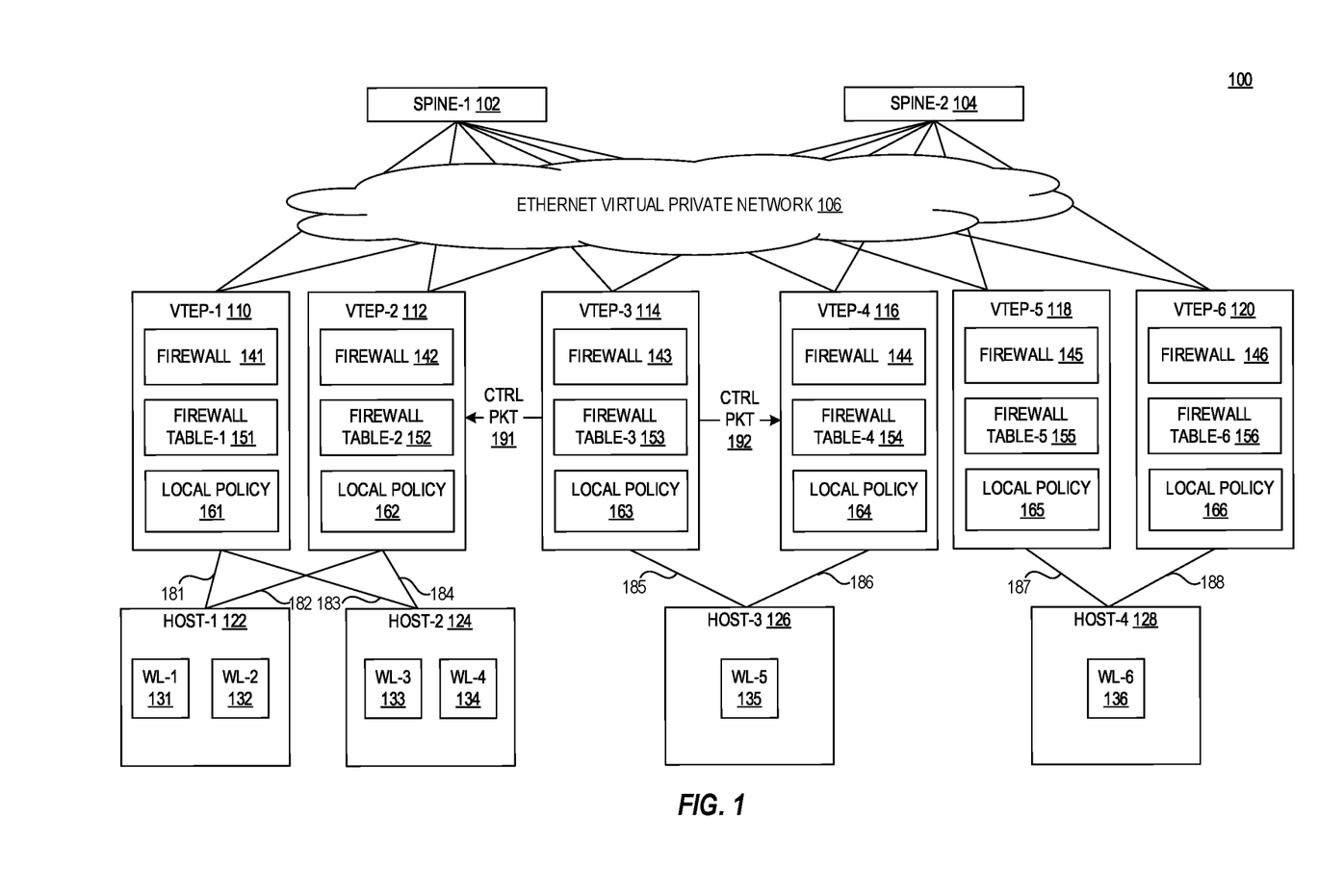
FIG. 1 is a block diagram depicting an example network environment that facilitates synchronization of firewall tables between network devices.

FIG. 1 is an example network environment 100 that facilitates synchronization of firewall tables between network devices. The network environment 100 may be a datacenter network implementing a spine-leaf topology, which includes network devices, such as switches, routers, or the like, operating as spine nodes or leaf nodes. The leaf nodes connect various hosts, such as servers, and the spine nodes interconnect the leaf nodes to form a physical infrastructure (e.g., an underlay network). The physical infrastructure may be virtualized using a virtualization technology, such as virtual extensible local area network (VXLAN), to form an overlay network, where the leaf nodes operate as VXLAN tunnel end points (VTEPs). As used herein, a VTEP may encapsulate and decapsulate packets (e.g., VXLAN packets) and forward traffic received from and sent to the hosts connected thereto.

In the example of FIG. 1, the spine nodes include spine-1 102, spine-2 104, and the leaf nodes include VTEP-1 110, VTEP-2 112, VTEP-3 114; VTEP-4 116, VTEP-5 118, and VTEP-6 120 (collectively referred to as VTEPs 110-120). The spine nodes 102-104 and the VTEPs 110-120 communicate with each other via an Ethernet Virtual Private Network (EVPN) 106. The VTEPs 110-120 communicate with hosts 122, 124, 126, and 128 over links 181, 182, 183, 184, 185, 186, 187, and 188, which may be wireless or wired communication links. Each host (e.g., a server) may run a plurality of workloads (e.g., virtual machines (VMs), applications, containers, etc.). The VTEP-1 110 and VTEP-2 112 are coupled to host-1 122 (via links 181 and 182) and host-2 124 (via links 183 and 184). Host-1 122 runs workloads WL-1 131 and WL-2 132, and host-2 124 runs workloads WL-3 133 and WL-4 134. VTEP-3 114 and VTEP-4 116 are coupled to a host-3 126 via links 185 and 186, respectively. The host-3 126 runs a workload WL-5 135. VTEP-5 118 and VTEP-6 120 are coupled to a host-4 128 via links 187 and 188, respectively. The host-4 128 runs a workload WL-6 136. It may be noted that although a limited number of spine nodes, leaf nodes (VTEPs), hosts, and workloads are depicted in the example of FIG. 1, the network environment 100 may include any number of such components.

A host may communicate with other hosts in the network environment 100 as part of "east-west" traffic movement. For example, workload WL-1 131 running on host-1 122 may exchange data, e.g., traffic with other workloads, such as workload WL-3 133 running on host-2 124 in the network environment 100. Alternatively, a host may communicate with external network(s) (e.g., devices external to the network environment 100) via the leaf and spine nodes. For example, the workload WL-2 132 running on host 122 may communicate with an external network by sending or receiving traffic from external devices (not shown in FIG. 1) via the leaf node VTEP-1 110 and the spine-1 102. In examples where a host communicates with external networks, a firewall service is used (e.g., at VTEPs) to ensure that security of the network environment 100 is not compromised by threats (e.g., malware attacks).

In examples described herein, each VTEP includes a respective firewall that monitors and controls traffic received at that VTEP. The firewall may be a service (e.g., a software application) executing at a VTEP for filtering traffic, which may include incoming and outgoing traffic. Incoming traffic may refer to traffic received from external network(s) and addressed to a host and outgoing traffic may refer to traffic received from a host and directed to an external network. As depicted in FIG. 1, each of the VTEPs 110-120 includes a firewall 141, 142, 143, 144, 145, and 146, respectively. As an example, the firewall 146 at VTEP-6 120 may filter incoming traffic addressed to the host-4 128 and may filter outgoing traffic from the host-4 128.

A firewall at a given VTEP may filter traffic by either allowing or denying traffic forwarding according to a set of firewall rules. The set of firewall rules is specified in a respective firewall table at each VTEP. As depicted in FIG. 1, each of the VTEPs 110-120 includes a firewall table including firewall table-1 151, firewall table-2 152, firewall table-3 153, firewall table-4 154, firewall table-5 155, and firewall table-6 156, respectively (collectively referred to as firewall tables 151-156). The firewall tables 151-156 may be "distributed" between the VTEPs 110-120, such that a firewall table at one VTEP may include a different set of firewall rules compared to that of a firewall table at another VTEP. For example, each of the firewall tables 151-156 may include a different set of firewall rules. In other examples, some VTEPs, among the VTEPs 110-120, may include firewall tables having the same set of firewall rules. For example, in FIG. 1, VTEPs 110 and 112 may be paired with each other (e.g., using a virtual switching extension enabled by a specific operating system) to provide high availability and/or redundancy. In such examples, the firewall table-1 151 and firewall table-2 152 may include the same set of firewall rules.

Each VTEP also stores respective local policies that govern the synchronization of the firewall tables between VTEPs. In the example of FIG. 1, each of the VTEPs 110-120 includes a local policy 161, 162, 163, 164, 165, and 166, respectively. A local policy may refer to one or more rule(s) for verification or checks performed before synchronizing or updating a firewall table at a VTEP. For example, a local policy may be a security rule to ensure that firewall tables are synchronized with firewall tables updates received from trusted devices. Additionally, such a local policy may ensure that firewall table updates received from untrusted devices are ignored or rejected.

As used herein, an "update" or "firewall table update" may refer to addition, deletion, editing, or the like, of one or more firewall rules in a firewall table. The synchronization of a firewall table between VTEPs may include creating or removing an identical firewall rule between the VTEPs. By implementing the synchronization process as described herein, the firewall rule(s) may be made consistent across the VTEPs.

To initiate the synchronization process, the VTEPs may monitor their respective firewall tables and detect if an update to their firewall table is available. In some examples, a VTEP may periodically check if updates to its firewall table are available. For example, the updates may include adding a new firewall rule to the firewall table, removing or deleting a firewall rule from the firewall table, or editing a firewall rule in the firewall table. Such changes may be performed by an administrator (e.g., a network administrator) or using an automated process (e.g., a computer program) for security, maintenance, or various other purposes. In the example of FIG. 1, a network administrator may update firewall table-3 153 by adding a new firewall rule, for example. Subsequently, the VTEP-3 114 may detect that a new firewall rule has been included in the firewall table-3 153 (e.g., using a background operation).

In some examples, to initiate the synchronization process, a VTEP may detect an occurrence of a specific event, which triggers the synchronization process. The event may be a movement of a workload from a host connected to the VTEP to another host in the network environment 100. Such movements of workloads may occur due to various factors, such as compute and/or memory resource management at hosts. As an example, in FIG. 1, the workload WL-5 135 may be moved from host-3 126 to another host, such as host-2 124.

In some other examples, the event may include failure or disruption of a communication link between a host and a VTEP. Such links may fail due to traffic congestion, bandwidth constraints, or the like. As an example, in FIG. 1, the link 185 between VTEP-3 114 and host-3 126 may fail (e.g., due to congestion). In such an event, the host-3 126 may temporarily use a different communication link, such as link 186, connecting the host-3 126 with the VTEP-4 116 for communication with external network(s).

In some examples, the event may include expiry of a predetermined period. VTEPs may maintain a timer (e.g., using a computer program) that checks if a predetermined period (e.g., few seconds, minutes, or hours) has expired. As an example, in FIG. 1, VTEP-1 110 may determine if a predetermined period (e.g., 5 minutes) has expired and initiate synchronization as described below When a VTEP detects an update to its firewall table (e.g., by an administrator) or detects an event (e.g., workload movement, link failure, or expiry of predetermined period), the VTEP may generate a control packet. A control packet may be a network packet including control plane configuration information. In examples described herein, the control packet may be based on an example EVPN route type. As used herein, "EVPN route type" may be a template or format including a plurality of fields to specify various control plane information. In examples described herein, EVPN route type includes fields to specify firewall updates and other control plane data. An example control packet format is described further in relation to FIG. 3.

In the example of FIG. 1, when the VTEP-3 114 detects that a new firewall rule is added to firewall table-3 153 (e.g., by an administrator), the VTEP-3 114 generates a control packet consistent with the EVPN route type. The control packet may indicate the new firewall rule included in the firewall table-3 153 by the administrator. The VTEP-3 114 may advertise the generated control packet to other VTEPs in the network environment 100. For example, the VTEP-3 114 may broadcast the control packet to all the VTEPs 110, 112, 116, 118, and 120. The VTEPs 110, 112, 116, 118, and 120 may receive the control packet and synchronize their firewall table with the update specified in the control packet according to their respective local policies.

The local policies of a VTEP may check if the control packet is received from a trusted device. For example, the local policy 161 at VTEP-1 110 may determine that the sender of the control packet is VTEP-3 114 (e.g., by inspecting the header of the control packet) and verify whether VTEP-3 114 is a trusted device (e.g., using a local registry of trusted devices). If the VTEP-3 114 is verified as a trusted device, then the VTEP-1 110 may accept the firewall table update specified in the control packet and add the new firewall rule to its firewall table-1 151. Similarly, other VTEPs 112, 116, 118, and 120 may also synchronize or not synchronize with the update from VTEP-3 114 according to their respective local policies. By synchronizing the firewall tables with the firewall table update from VTEP-3 114 in this manner, examples described herein reduce the tedious task of updating the firewall table at each VTEP.

In another instance, when the VTEP-3 114 detects an event, e.g., movement of the workload WL-5 135 from the host-3 126 to the host-2 124, the VTEP-3 114 generates a control packet consistent with the EVPN route type. The control packet may include one or more firewall rule(s) associated with the workload WL-5 135 specified in the firewall table-3 153. The VTEP-3 114 may advertise the generated control packet 191 (labeled as "CTRL PKT 191") to the VTEP-2 112 and not to other VTEPs in the network environment 100. The VTEP-2 112 receives the control packet 191 and may synchronize the firewall table-2 152 with the update from VTEP-3 114 according to the local policy 162 (as described earlier). By synchronizing the firewall table-2 152 with the firewall table update from VTEP-3 114 in this manner, examples described herein reduce manual intervention to update the firewall table-2 152 at the VTEP-2 112. Examples also ensure that the traffic received by or sent from the workload WL-5 135 is not blocked by the firewall 142 at the VTEP-2 112, thereby allowing seamless communication between host-2 124 in the datacenter and external network(s).

In another instance, VTEP-3 114 detects an event, e.g., failure of link 185 between host-3 126 and VTEP-3 114. In such an event, the host-3 126 may temporarily use a different communication link, such as link 186 connecting the host-3 126 with the VTEP-4 116. VTEP-3 114 generates a control packet consistent with the EVPN route type. The control packet may include all the firewall rules specified in the firewall table-3 153. VTEP-3 114 may advertise the generated control packet 192 (labeled as "CTRL PKT 192") to VTEP-4 116 and not to other VTEPs in the network environment 100. VTEP-4 116 receives the control packet 192 and may synchronize the firewall table-4 154 according to local policy 164 (as described earlier). By synchronizing the firewall table-4 154 with the firewall table update from VTEP-3 114 in this manner, examples described herein reduce manual intervention to update the firewall table-4 154 at VTEP-4 116. Examples also ensure that the traffic received by or sent from the workload, WL-5 135, is not blocked by the firewall 144 at the VTEP-4 116, thereby allowing seamless communication between host-3 126 in the datacenter and external network(s).

In another instance, when VTEP-1 110 detects an event (e.g., expiry of a predetermined period), the VTEP-1 110 generates a control packet consistent with the EVPN route type. The control packet may include an update comprising all firewall rules specified in the firewall table-1 151. The VTEP-1 110 may advertise the generated control packet to other VTEPs in the network environment 100. For example, the VTEP-1 110 may broadcast the control packet to all the VTEPs 112, 114, 116, 118, and 120. The VTEPs 112, 114, 116, 118, and 120 may receive the control packet and synchronize their firewall table with the update specified in the control packet according to their respective local policies. By synchronizing firewall tables in a periodic manner, examples described herein ensure that the firewall rules across all the VTEPs are consistent. Examples may also ensure new VTEPs installed in the environment 100 also synchronize their firewall tables with such periodic updates.

Figure 2:
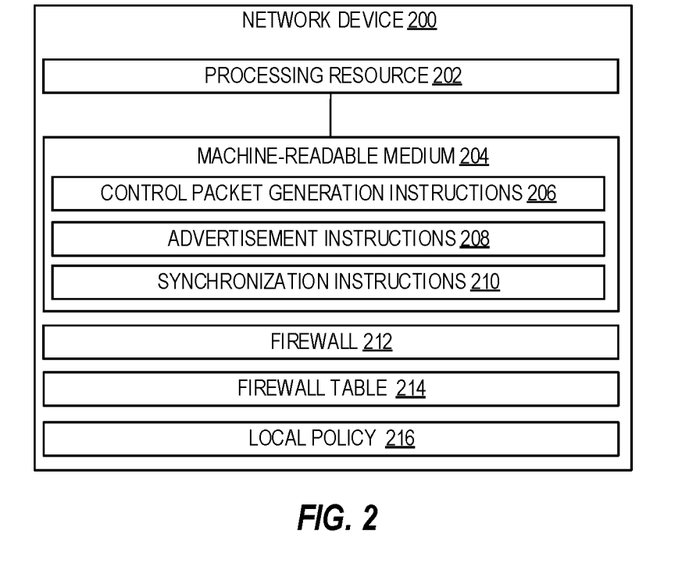
FIG. 2 is a block diagram depicting an example network device implemented as a VXLAN Tunnel Endpoint (VTEP) that advertises and synchronizes firewall table with updates from neighboring network devices.

FIG. 2 is a block diagram of an example network device implemented as a VTEP that advertises and synchronizes firewall table with updates from neighboring network devices. The network device 200 may be a switch, a router, a gateway, or the like, that forwards traffic between one or most hosts and devices external to the network. The network device 200 includes at least one processing resource 202 and at least one machine-readable medium 204 storing (e.g., encoded with) instructions. The instructions include at least control packet generation instructions 206, advertisement instructions 208, and synchronization instructions 210.

The network device 200 runs a firewall 212 to control traffic received from hosts or external devices based on a firewall table 214. The firewall table 214 may include a plurality of firewall rules. Each firewall rule may include one or more constraints and an action. The one or more constraints may include source media access control (MAC) address, destination MAC address, source internet protocol (IP) address, destination IP address, source port, destination port, traffic direction, workload identifier, etc. The action may include "allow" or "block" forwarding of the traffic. The network device 200 also stores a local policy 216, which may refer to a set of rules governing the synchronization of the firewall table 214 with firewall table updates received from other network devices. The processing resource 202 executes the instructions 206, 208, and 210 stored in the machine-readable medium 204 to advertise firewall table updates and synchronize firewall tables with other network devices.

The processing resource 202 executes the control packet generation instructions 206 to generate a control packet indicating an update in the firewall table 214. The control packet may be consistent with the EVPN route type that allows the incorporation of firewall table updates. The updates may be changes, such as addition, deletion, or editing, of one or more firewall rules in the firewall table 214. The control packet generation instructions 206 generates the control packet whenever such updates in the firewall table 214 are detected. For example, the instructions 206 may monitor the firewall table 214 to detect updates using a background operation. The background operation may include taking snapshots of the firewall table 214 periodically and identifying changes between such snapshots.

In some examples, the control packet generation instructions 206 may generate a control packet whenever an event occurs. The event may be movement of a workload from a host (connected to the network device 200) to another host (not connected to the network device 200). In such examples, the control packet includes the specific firewall rule(s) associated with the workload. In another example, the event may be a link failure between a host and the network device 200. In such examples, the control packet may include firewall rules associated with all workloads executing on the host.

The processing resource 202 executes the advertisement instructions 208 to advertise the generated control packet to other network devices. For example, the advertisement instructions 208 may broadcast the control packet to neighboring network devices connected to the network device 200 over an EVPN. The network device 200 may discover the neighboring network devices based on their device identifiers (e.g., IP addresses) or network identifiers (e.g., a virtual network identifier (VNI) of VXLAN network). In some examples, the advertisement instructions 208 may send the control packet to specific network devices and not to each neighboring network device.

In some examples, the network device 200 may receive control packets from a neighboring network device when updates to firewall table at the neighboring network device are made or events that trigger firewall table updates (e.g., workload movement, link failure, etc.) occur at the neighboring network device. The processing resource 202 executes the synchronization instructions 210 to synchronize the firewall table 214 with the firewall table update from the neighboring network device as indicated in the received control packet.

In some examples, the synchronization may be performed according to the local policy 216 stored at the network device 200. The local policy 216 may include a set of rules that determine whether synchronization can be performed or not. For example, the local policy may include a rule to determine whether the neighboring network device is a trusted device or not. If the neighboring network device is a trusted device, then the synchronization instructions 210 may accept the update as indicated in the control packet. After accepting the update, the synchronization may include modifying the firewall table 214 according to the firewall table update specified in the control packet. Modifying the firewall table 214 may include adding, deleting, or editing firewall rule(s) in the firewall table 214.

Figure 3:
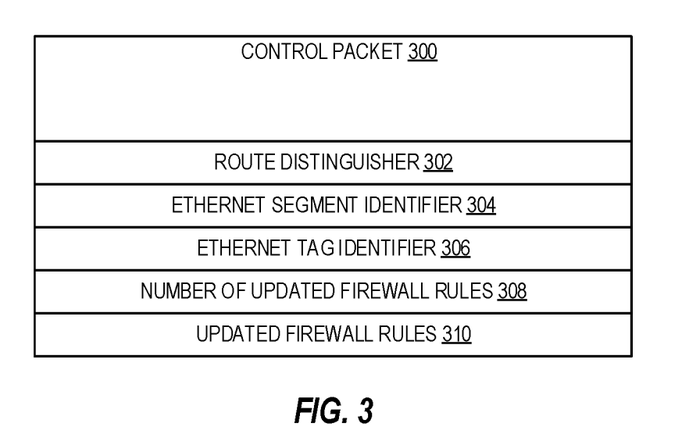
FIG. 3 is a diagram depicting a control packet based on an example Ethernet Virtual Private Network (EVPN) route type specifying firewall rules.

FIG. 3 depicts a control packet 300 based on an example Ethernet Virtual Private Network route type specifying firewall rules. The control packet 300 is a type of a control plane packet used for exchanging firewall table updates between network devices. The control packet may conform to a specific EVPN route type, which is a format or template for incorporating firewall table updates. As depicted in FIG. 3, the control packet 300 consistent with EVPN route type may include fields to specify control plane data, such as a route distinguisher 302, an ethernet segment identifier 304, an ethernet tag identifier 306, a number of updated firewall rules 308, and firewall table updates 310. The route distinguisher 302 may be an identifier used for differentiating different EVPN instances in an EVPN. The ethernet segment identifier 304 may be a unique identifier of connection between network devices. The ethernet tag identifier 306 may refer to a virtual local area network identifier configured on the network device. The number of updated firewall rules 308 may indicate the total number of firewall rules modified. The updated firewall rules 310 may indicate the firewall table updates, which include the modified firewall rules, such as new firewall rules added, deleted firewall rules, edited firewall rules.

Figure 4:
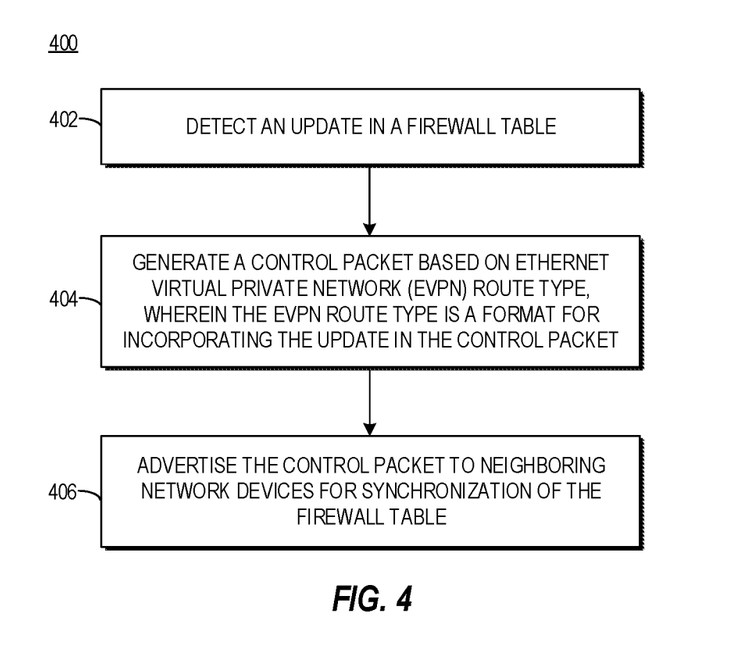
FIG. 4 is a flow chart for an example method implemented at a VTEP that advertises firewall table updates to neighboring network devices.
Figure 5:
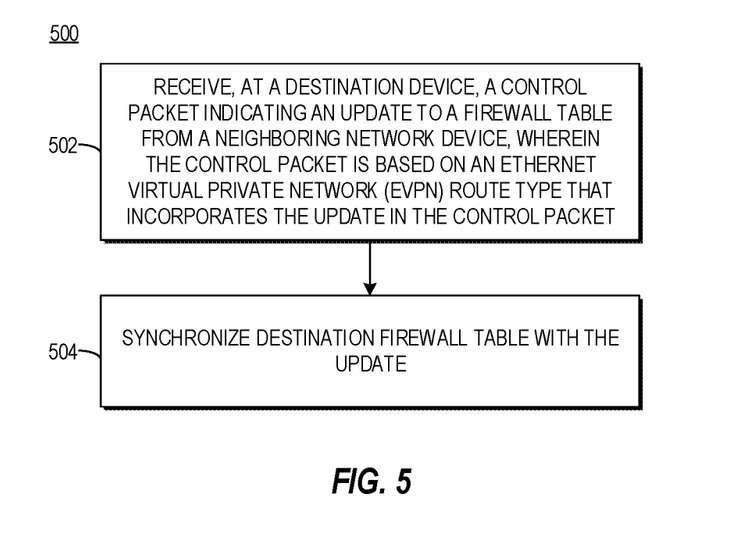
FIG. 5 is a flow chart for an example method implemented at a VTEP that synchronizes firewall table with updates from neighboring network devices.

Examples of advertising firewall table updates and synchronizing firewall tables is described in relation to FIGS. 1, 4, and 5. FIG. 4 is a flow chart for an example method 400 implemented at a VTEP that advertises firewall table updates to neighboring network devices. As an example, the example method 400 may be implemented at VTEP-3 114 of FIG. 1 and may include advertising control packets specifying updates made to firewall table-3 153 at the VTEP-3 114.

At block 402, method 400 includes detecting an update to a source firewall table (e.g., firewall table-3 153) at a source device (e.g., VTEP-3 114). As used herein, a "source device" refers to a network device or VTEP that advertises firewall table updates and "source firewall table" refers to a firewall table at the source device. Detecting an update may include monitoring the source firewall table at the source device. For example, the VTEP-3 114 may monitor the firewall table-3 153 by taking snapshots of the firewall table-3 153 at periodic intervals (e.g., as a background operation). The VTEP-3 114 may detect a firewall table update by comparing two consecutive snapshots of the firewall table-3 153. Table 1 and Table 2 below depict the firewall table-3 153 at a VTEP-3 114 at different time periods. Table 1 depicts the firewall table-3 153 prior to changes made to firewall rules by an administrator.

TABLE 1

Source firewall table prior to an update

| Rule | Source IP address | Port | Destination IP address | Port | Traffic direction | Action |
|---|---|---|---|---|---|---|
| 1 | 10.10.1.0/24 | Any | 10.10.0.0/24 | Any | Outgoing | Deny |
| 2 | 10.10.0.0/16 | Any | 10.1.0.0/24 | 80 | Incoming | Allow |
| 3 | 10.10.1.0/24 | Any | 10.1.0.5/32 | Any | Incoming | Deny |
| 4 | 10.10.2.0/24 | Any | 10.1.0.8/32 | Any | Incoming | Allow |

As depicted, the firewall table-3 153 specifies firewall rules including constraints, which may include source and destination addresses, source and destination ports, traffic direction, or the like. Each firewall rule may also include actions, such as allow or deny, corresponding to the constraints of that firewall rule. In some examples, the actions may also include log or copy information (e.g., traffic metadata), or the like.

Table 2 below depicts the firewall table-3 153 after an update, e.g., firewall rule changes made by an administrator. For example, the administrator may edit "Rule 2", where the action is changed from "Allow" to "Deny," and delete "Rule 4."

TABLE 2

Source firewall table after the update

| Rule | Source IP address | Port | Destination IP address | Port | Traffic direction | Action |
|---|---|---|---|---|---|---|
| 1 | 10.10.1.0/24 | Any | 10.10.0.0/24 | Any | Outgoing | Deny |
| 2 | 10.10.0.0/16 | Any | 10.1.0.0/24 | 80 | Incoming | Deny |
| 3 | 10.10.1.0/24 | Any | 10.1.0.5/32 | Any | Incoming | Deny |

At block 404, method 400 includes generating a control packet based on an EVPN route type. The EVPN route type is a format for incorporating the firewall table update in the control packet. The control packet may include a field for firewall table updates (e.g., 310 in FIG. 3) that specifies the changes made to the firewall table-3 153. For example, the field may specify editing "Rule 2" (as indicated in Table 2) and deleting "Rule 4." In some examples, the control packet may include additional information about the firewall table update. For example, the control packet may include a field to specify the number of updated firewall rules (e.g., 308 in FIG. 3). In this example, such a field may indicate "2" as only "Rule 2" and "Rule 4" were updated and other firewall rules (e.g., "Rule 1" and "Rule 3") were not updated.

At block 406, method 400 includes advertising the control packet to a destination device for synchronization of the firewall table. As used herein, a "destination device" refers to a neighboring network device or a VTEP connected to the source device. The source device (VTEP-3 114) may transmit the control packet specifying the firewall table update to each neighboring network device via EVPN. In some examples, the network device may identify one or more destination devices based on their device identifiers (e.g., IP addresses) or network identifiers (e.g., VNIs) and broadcast the control packet to the identified destination devices. Alternatively, the source device may transmit the control packet to specific destination devices, which may be preprogrammed in the source device.

FIG. 5 is a flow chart for an example method implemented at a VTEP that synchronizes firewall table with updates received from neighboring network devices. As an example, the example method 500 may be implemented at VTEP-1 110 of FIG. 1 and may include synchronizing with updates made to firewall table-3 153.

At block 502, method 500 includes receiving, at a destination device (e.g., VTEP-1 110), a control packet indicating an update to a source firewall table (firewall table-3 153) from a source device (VTEP-3 114). The control packet is based on an EVPN route type that incorporates the update in the control packet. For example, the control packet may include editing the "Rule 2" and deleting "Rule 4" of the source firewall table described in relation to FIG. 4.

The destination device VTEP-1 110 may include a destination firewall table-1 151 specifying firewall rules. Table 3 below depicts an example destination firewall table-1 151 before synchronization. As depicted, the destination firewall table-1 151 includes "Rule 5," "Rule 6," and "Rule 7."

TABLE 3

Destination firewall table before synchronization

| | Source | | Destination | | Traffic | |
|---|---|---|---|---|---|---|
| Rule | IP address | Port | IP address | Port | direction | Action |
| 5 | 10.10.1.0/48 | Any | 10.10.0.0/24 | Any | Outgoing | Allow |
| 6 | 10.10.0.0/24 | Any | 10.1.0.0/32 | 80 | Outgoing | Deny |
| 4 | 10.10.2.0/24 | Any | 10.1.0.8/32 | Any | Incoming | Allow |

At 504, method 500 includes synchronizing the destination firewall table-1 151 at the destination device VTEP-1 110 with updates to the source firewall table-3 153. Synchronizing the destination firewall table-1 151 with the updates may include modifying the destination firewall table-1 151 such that one or more firewall rules match the updated firewall rules indicated in the control packet. For example, the updates from source device VTEP-3 114 may include adding "Rule 2" (from Table 2) and deleting "Rule 4" of the source firewall table-3 153 (as indicated in Table 1).

Accordingly, method 500 may add "Rule 2" to the destination firewall table-1 151. Method 500 may also identify and delete "Rule 4" from the destination firewall table-1 151 as part of the synchronization process. Table 4 below depicts the destination firewall table-1 151 after synchronization, e.g., with updates received from the source device VTEP-3 114.

TABLE 4

Destination firewall table after synchronization

| | Source | | Destination | | Traffic | |
|---|---|---|---|---|---|---|
| Rule | IP address | Port | IP address | Port | direction | Action |
| 5 | 10.10.1.0/48 | Any | 10.10.0.0/24 | Any | Outgoing | Allow |
| 6 | 10.10.0.0/24 | Any | 10.1.0.0/32 | 80 | Incoming | Deny |
| 2 | 10.10.0.0/16 | Any | 10.1.0.0/24 | 80 | Incoming | Deny |

As depicted in Table 4, the destination firewall table-1 151 includes "Rule 2" and does not include "Rule 4" after synchronization.

Figure 6:
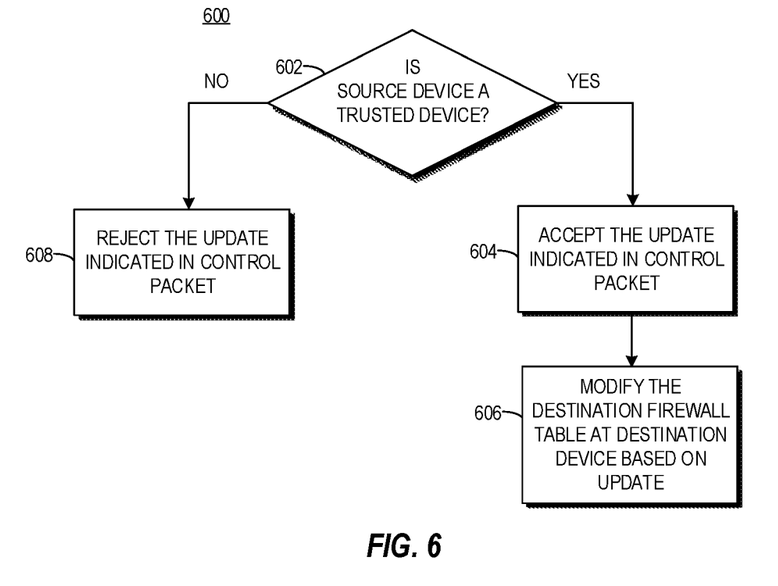
FIG. 6 is a flow chart for an example method for synchronizing firewall table with updates based on a local policy.

Examples of synchronizing firewall tables using local policies is described in relation to FIGS. 1, 4, 5, 6, and 7. FIG. 6 is a flow chart for an example method 600 for synchronizing a firewall table with updates based on a local policy. The local policy may include a set of rules to determine whether synchronization of the firewall table can be performed or not. The method 600 may be performed at a destination device (e.g., VTEP-1 110), for example. The method 600 may synchronize the destination firewall table-1 151 (Table 3) of the destination device VTEP-1 110 with updates made to source firewall table-3 153 (depicted in Table 2) of VTEP-3 114.

At block 602, method 600 determines whether the source device (e.g., VTEP-3 114) is a trusted device or not before synchronization. For example, the method 600 may include determining if the VTEP-3 114 is associated with a spoofed address, a history of malware attacks, spamming, or the like. The determination may be made by referring to a repository storing identities of network devices having such characteristics.

If the VTEP-3 114 is a trusted device ("YES" at block 602), then method proceeds to block 604. At block 604, method 600 includes accepting the update indicated in the control packet and proceeding to block 606.

At block 606, method 600 includes modifying the destination firewall table-1 151 at the VTEP-1 110 based on the update. As described earlier, modifying a firewall table may include actions, such as adding, deleting, or editing firewall rule(s) in the firewall table. For example, the VTEP-1 110 may add the "Rule 2" to the destination firewall table-1 151 and delete "Rule 4" from the destination firewall table-1 151. The destination firewall table-1 151 after the modification is depicted in Table 4.

If VTEP-3 110 is not a trusted device ("NO" at block 602), method 600 proceeds to block 608. At block 608, method 600 rejects the update indicated in the control packet. In such instances, method does not modify the destination firewall table-1 151 and synchronization is not performed. For example, the VTEP-1 110 may not add the "Rule 2" to the destination firewall table-1 151 and delete "Rule 4" from the destination firewall table-1 151.

Figure 7:
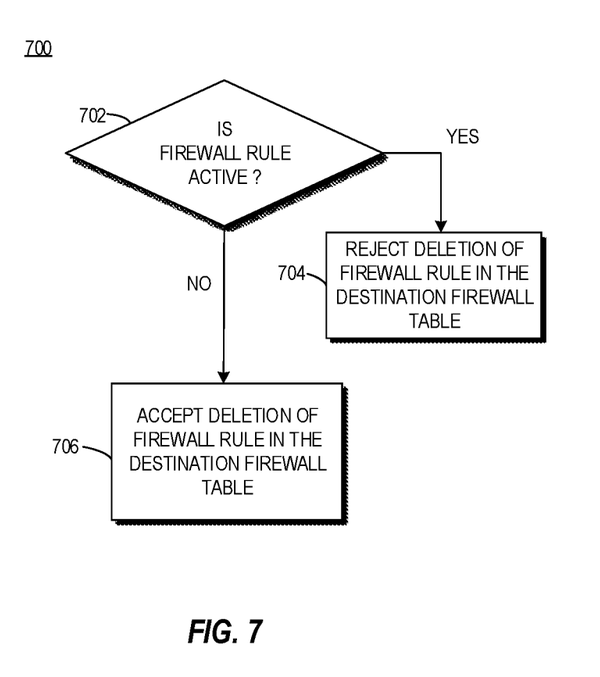
FIG. 7 is a flow chart for an example method for the deletion of firewall rules based on a local policy.

FIG. 7 is a flow chart for an example method 700 for deletion of firewall rules according to a local policy. The method 700 may be performed at a destination device before synchronization. For example, a destination device (e.g., VTEP-1 110) may receive a control packet indicating deletion of firewall rule(s) of the destination firewall table (e.g., firewall table-1 151 depicted in Table 3). The local policy at the destination device may determine whether the deletion of the firewall rule(s) should be performed.

At block 702, method 700 includes determining whether the firewall rule to be deleted (e.g., "Rule 4" from the destination firewall table-1 151 (depicted in Table 3)) is active or dormant. As used herein, "active" may refer to frequent or recent usage of a firewall rule and "dormant" may refer to infrequent or no usage of a firewall rule. For example, if a firewall rule has not been for allowing or blocking a traffic for a predetermined period (e.g., a day), then the firewall rule may be considered "dormant," otherwise it may be considered as "active". If "Rule 4" at the destination firewall table-1 151 is active ("YES" at block 702), method 700 proceeds to block 704.

At block 704, method 700 includes rejecting deletion of the "Rule 4" in the destination firewall table-1 151 (depicted in Table 3). By rejecting deletion of active firewall rules at the destination firewall tables in this manner, examples described herein prevent deletion of frequently used firewall rules, which may be important to ensure security in the datacenter. Further, an administrator may be notified that the given rule could not be deleted, and firewall table synchronization may be aborted.

If the firewall rule is dormant ("NO" at block 702), method 700 proceeds to block 706. For example, if "Rule 4" at the destination firewall table-1 151 is dormant, method 700 proceeds to block 706.

At block 706, method 700 includes accepting the deletion of firewall rule in the destination firewall table-1 151. For example, the VTEP-1 110 may delete the "Rule 4" from the destination firewall table-1 151 (as described in relation to Table 4).

Figure 8:
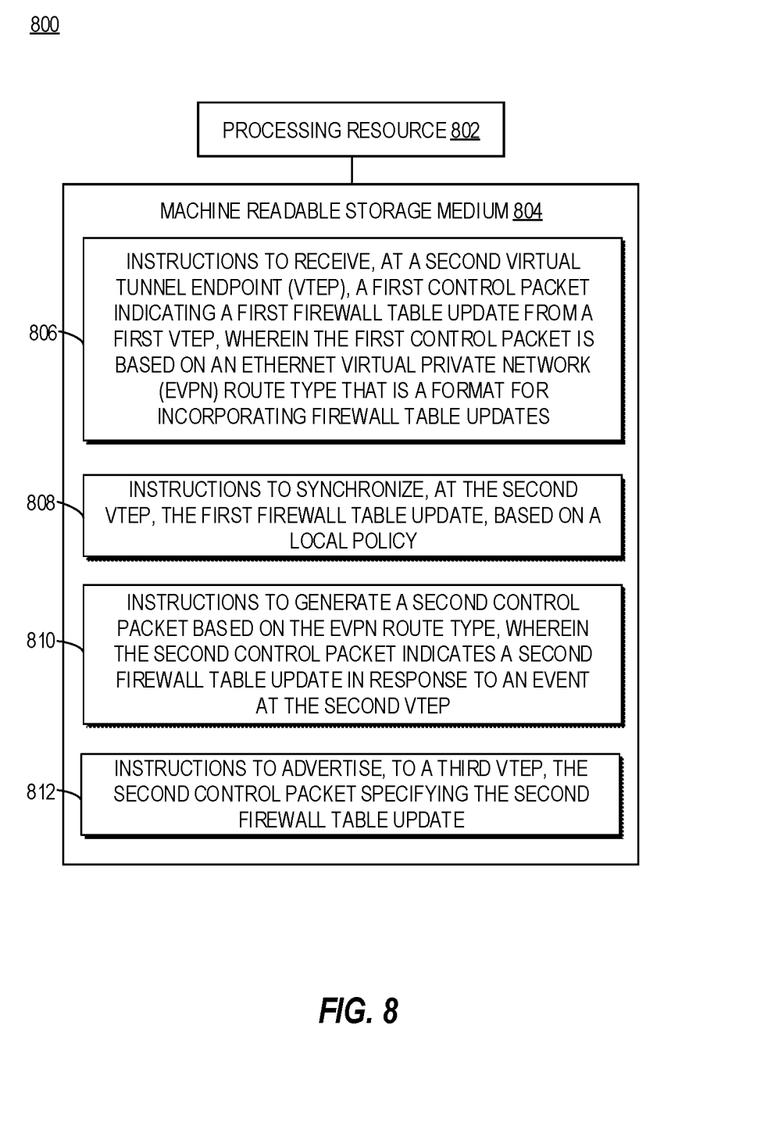
FIG. 8 is a block diagram depicting a processing resource and a machine-readable medium encoded with example instructions to synchronize firewall tables with updates.

FIG. 8 is a block diagram depicting a processing resource 802 and a machine-readable medium 804 encoded with example instructions to synchronize firewall table with updates. The processing resource 802 and the machine-readable medium 804 may be components of a VTEP, such as VTEP-1 110 of FIG. 1 (referred to herein as "second VTEP"). The second VTEP may receive firewall table updates from a neighboring VTEP, such as VTEP-3 114 of FIG. 1 (referred to herein as "first VTEP"). The second VTEP may also advertise updates to another neighboring VTEP, such as VTEP-4 116 (referred to as "third VTEP"). Alternatively, the processing resource 802 and the machine-readable medium 804 may be examples of processing resource 202 and machine-readable medium 204

At the second VTEP, the instructions 806, when executed, cause the processing resource 802 to receive a first control packet indicating a first firewall table update from the first VTEP. The first control packet is based on an EVPN route type, which is a format for incorporating firewall table updates. As an example, the first firewall table update may include addition of a new firewall rule to the firewall table at the first VTEP. The addition of the new firewall rule may be initiated by an administrator, for example.

The instructions 808, when executed, cause the processing resource 802 to synchronize a firewall table at the second VTEP with the first firewall table update indicated in the first control packet. Synchronizing may include adding the new firewall rule to the firewall table at the second VTEP. In some examples, the synchronization may be based on a local policy at the second VTEP to ensure security. For example, the local policy may check if the first VTEP is a trusted device before synchronization is performed (as described in relation to FIG. 6).

The instructions 810, when executed, cause the processing resource 802 of the second VTEP to generate a second control packet based on the EVPN route type. The second control packet may indicate a second firewall table update when modification to the firewall table (e.g., editing of a firewall rule in the firewall table) at the second VTEP is detected. In such examples, the second firewall table update may include the modified firewall rule (e.g., the edited firewall rule). In some examples, the second control packet may indicate a second firewall table update on detecting an event at the second VTEP. The event may include movement of a workload from a host connected to the second VTEP or a link failure between the host and the second VTEP, for example. In such examples, the second firewall table update may include firewall rules associated with workload(s) running on the host connected to the second VTEP.

The instructions 812, when executed, cause the processing resource 802 of the second VTEP to advertise the second control packet specifying the second firewall table update to the third VTEP. The second VTEP may transmit the second control packet based on an identifier, such as a device identifier (e.g., IP address). In some examples, the second VTEP may broadcast the second control packet to multiple VTEPs based on network identifiers (e.g., VNI of VXLAN network) connected to the second VTEP.

The term "network device" may refer to a switch, a router, a hub, a gateway, or any network device that is capable of connecting or bridging networks or sub-networks. In various examples, the network device may be a device including a processor or microcontroller and/or any other electronic component, or a device or system that may facilitate various compute and/or data storage services. Examples of the device may include, but are not limited to, a desktop computer, a laptop, a smartphone, a server, a computer appliance, a workstation, a storage system, or a converged or hyperconverged system, and the like. The devices may have similar or varying hardware and/or software configurations in a given implementation of the networked system. In some examples, the network device may be implemented as a virtual machine, a service, such as a web service or a microservice coupled through an application programming interface (API).

The term "workload" may refer to a computing resource including, but not limited to, a virtual machine (VM), an application (e.g., software program), or a containerized application (e.g., in the form of a container or a pod of containers). In some examples, the workload may include any piece of code that may be developed as a microservice. As will be understood, a workload, such as a VM, may be an instance of an operating system on a given host via a VM host program, such as a hypervisor. Further, a workload such as a container may be a packaged application with its dependencies (e.g., operating system resources, processing allocations, memory allocations, etc.) executing on a given host via a container host program, such as a container runtime (e.g., Docker Engine), for example. Further, in some examples, workloads may include pods that are formed by grouping one or more containers. For example, a set of containers that are associated with a common application may be grouped to form a pod.

The term "host" may refer to a device including a processor or microcontroller and/or any other electronic component, or a device or system that may facilitate workload execution. A host may provide resources, for example, compute, storage, and/or networking capabilities, for the workload execution. Examples of the host may include, but are not limited to, a server, clusters of servers, a computer appliance, a storage system, or a converged or hyperconverged system, a workstation, a desktop computer, a laptop, a smartphone, or the like. In FIG. 1, although the environment 100 is shown to include a limited number of hosts, the environment 100 may include any number of hosts, without limiting the scope of the present disclosure. The hosts may have similar or varying hardware and/or software configurations in a given implementation of the environment 100.

The term "processing resource" may refer to one or more physical device(s), for example, one or more central processing units (CPU), one or more semiconductor-based microprocessors, one or more graphics processing units (GPU), application-specific integrated circuit (ASIC), a field-programmable gate array (FPGA), other hardware devices capable of retrieving and executing instructions stored in the machine-readable medium, or combinations thereof. The processing resource may fetch, decode, and execute the instructions stored in the machine-readable medium to advertise control packets and synchronize distributed firewall tables. Further, the processing resource may also include at least one integrated circuit (IC), control logic, electronic circuits, or combinations thereof that include a number of electronic components for performing the functionalities intended to be performed by the device. Moreover, in certain examples, where the device may be a virtual machine or a containerized application, the processing resource and the machine-readable medium may represent a processing resource and a machine-readable medium of the hardware or a computing device that hosts the device as the virtual machine or the containerized application. In some examples, the processing resource may include virtual resources provisioned through a virtual machine executing on IaaS provider server.

The term "machine-readable medium" may be any electronic, magnetic, optical, or other physical storage device that may store data and/or executable instructions. For example, the machine-readable medium may include one or more of a Random Access Memory (RAM), an Electrically Erasable Programmable Read-Only Memory (EEPROM), a storage drive, a flash memory, a Compact Disc Read-Only Memory (CD-ROM), or the like. The machine-readable medium may be non-transitory. As described in detail herein, the machine-readable medium may be encoded with the executable instructions to perform one or more method(s), for example, method described in FIGS. 4, 5, 6, and 7. In the examples described above, functionalities described as being performed by "instructions" may be understood as functionalities that may be performed by those instructions when executed by the processing resource. In other examples, functionalities described in relation to instructions may be implemented by any combination of hardware and programming.

Although the present disclosure has been described in detail, it should be understood that various changes, substitutions, and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." is used to provide examples merely for the purpose of clarity. It is not intended that the disclosure be limited by the examples provided in these phrases and parentheticals. The scope and understanding of this disclosure may include certain examples that are not disclosed in such phrases and parentheticals.

What is claimed is:

1. A first network device comprising:
   a first virtual extensible local area network (VXLAN) tunnel endpoint (VTEP) comprising:
      a processing resource; and
      a non-transitory machine-readable medium storing instructions executable by the processing resource to:
         detect that a first firewall table at the first VTEP is updated, wherein the detected update is a change of a firewall rule in the first firewall table;
         generate a control packet based on an Ethernet Virtual Private Network (EVPN) route type, wherein the EVPN route type is a format comprising a field specifying the update of the first firewall table; and
         advertise the control packet to a second VTEP in a second network device to update a second firewall table at the second VTEP with the update of the first firewall table specified in the field included in the control packet.

2. The first network device of claim 1, wherein the update of the first firewall table comprises an addition, a deletion, or an edit of a firewall rule in the first firewall table.

3. The first network device of claim 1, wherein the format of the EVPN route type further comprises:
   one or more of a route distinguisher, an ethernet segment identifier, an ethernet tag identifier, or a number of updated firewall rules.

4. The first network device of claim 1, wherein the first VTEP is to advertise the control packet by broadcasting the control packet to neighboring VTEPs.

5. The first network device of claim 1, wherein the first VTEP comprises a first firewall to control traffic according to firewall rules in the first firewall table, and the second VTEP comprises a second firewall to control traffic according to firewall rules in the second firewall table.

6. The first network device of claim 1, wherein the instructions are executable by the processing resource to:
   detect movement of a workload from a first host connected to the first VTEP to a second host connected to the second VTEP; and
   based on detecting the movement of the workload from the first host to the second host, identify a firewall rule in the first firewall table associated with the workload, and advertise, to the second VTEP, a further control packet based on the EVPN route type, the further control packet comprising the firewall rule associated with the workload and the further control packet to cause an update of the second firewall table with the firewall rule.

7. The first network device of claim 1, wherein the instructions are executable by the processing resource to:
   detect a link failure between the first VTEP and a host; and
   based on detecting the link failure, identify firewall rules in the first firewall table associated with workloads running in the host, and advertise, to the second VTEP, a further control packet based on the EVPN route type, the further control packet comprising the firewall rules associated with the workloads and the further control packet to cause an update of the second firewall table with the firewall rules.

8. A method comprising:
   receiving, at a destination virtual extensible local area network (VXLAN) tunnel endpoint (VTEP) from a source VTEP, a control packet containing a firewall rule of a source firewall table at the source VTEP, wherein the control packet is based on an Ethernet Virtual Private Network (EVPN) route type, and wherein the EVPN route type is a format comprising a field containing the firewall rule; and
   based on a local policy of the destination VTEP, updating, by the destination VTEP, a destination firewall table at the destination VTEP with the firewall rule contained in the control packet,
   wherein the source VTEP comprises a firewall to control traffic according to the source firewall table at the source VTEP, and the destination VTEP comprises a firewall to control traffic according to the destination firewall table at the destination VTEP.

9. The method of claim 8, wherein the destination VTEP determines according to the local policy whether the source VTEP is a trusted device.

10. The method of claim 8, wherein the updating of the destination firewall table comprises:
    adding, deleting, or editing a firewall rule in the destination firewall table.

11. The method of claim 8, wherein the control packet is received at the destination VTEP from the source VTEP responsive to a workload being moved from a first host connected to the source VTEP to a second host connected to the destination VTEP.

12. The method of claim 11, wherein the firewall rule in the control packet was identified by the source VTEP as associated with the workload that has moved from the first host to the second host.

13. The method of claim 8, wherein the control packet is received at the destination VTEP from the source VTEP responsive to a link failure between the source VTEP and a host.

14. The method of claim 13, wherein the firewall rule in the control packet was identified by the source VTEP as associated with a workload in the host.

15. The method of claim 8, wherein the control packet comprises a plurality of firewall rules, and the destination VTEP updates the destination firewall table using the plurality of firewall rules in the control packet.

16. A non-transitory machine-readable medium comprising instructions that upon execution cause a first virtual extensible local area network (VXLAN) tunnel endpoint (VTEP) to:
  control, by a first firewall in the first VTEP, traffic according to a first firewall table at the first VTEP;
  detect, at the first VTEP, an event indicating that a second firewall table at a second VTEP is to be updated;
  generate, at the first VTEP in response to the event, a control packet including a firewall rule update, wherein the control packet is based on an Ethernet Virtual Private Network (EVPN) route type that is a format comprising a field specifying the firewall rule update; and
  advertise, to the second VTEP, the control packet to update the second firewall table at the second VTEP with the firewall rule update.

17. The non-transitory machine-readable medium of claim 16, wherein the event includes movement of a workload from a first host connected to the first VTEP to a second host connected to the second VTEP.

18. The non-transitory machine-readable medium of claim 17, wherein the instructions upon execution cause the first VTEP to:
  identify a firewall rule associated with the workload that has moved from the first host to the second host; and
  include the firewall rule update in the control packet to specify an update of the firewall rule in the second firewall table at the second VTEP.

19. The non-transitory machine-readable medium of claim 16, wherein the event includes a link failure between the first VTEP and a host.

20. The non-transitory machine-readable medium of claim 19, wherein the instructions upon execution cause the first VTEP to:
  identify firewall rules associated with workloads running in the host; and
  include the firewall rule update in the control packet to specify an update of the firewall rules in the second firewall table at the second VTEP.

* * * * *